US011620153B2

(12) United States Patent
Lichtenau et al.

(10) Patent No.: US 11,620,153 B2
(45) Date of Patent: Apr. 4, 2023

(54) INSTRUCTION INTERRUPT SUPPRESSION OF OVERFLOW EXCEPTION

(71) Applicant: INTERNATIONAL BUSINESS MACHINES CORPORATION, Armonk, NY (US)

(72) Inventors: Cedric Lichtenau, Stuttgart (DE); Jonathan D. Bradbury, Poughkeepsie, NY (US); Reid Copeland, Ontario (CA); Petra Leber, Ehningen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/266,752

(22) Filed: Feb. 4, 2019

(65) Prior Publication Data
US 2020/0249982 A1    Aug. 6, 2020

(51) Int. Cl.
*G06F 9/48* (2006.01)
*G06F 9/38* (2018.01)
*G06F 9/30* (2018.01)

(52) U.S. Cl.
CPC .......... *G06F 9/4812* (2013.01); *G06F 9/3836* (2013.01); *G06F 9/3861* (2013.01); *G06F 9/3865* (2013.01); *G06F 9/30185* (2013.01)

(58) Field of Classification Search
CPC .. G06F 9/3861; G06F 9/3865; G06F 9/30181; G06F 9/30185; G06F 9/30189; G06F 9/30018; G06F 9/3001; G06F 7/4991; G06F 7/49905; G06F 9/30094; G06F 9/30014
See application file for complete search history.

(56) References Cited

U.S. PATENT DOCUMENTS

| 5,469,552 A * | 11/1995 | Suzuki ................. G06F 9/3861 712/206 |
| 5,812,439 A * | 9/1998 | Hansen ............... G06F 9/30014 708/497 |
| 5,907,714 A | 5/1999 | Boutaud et al. |
| 7,546,446 B2 | 6/2009 | Henry et al. |

(Continued)

FOREIGN PATENT DOCUMENTS

| CN | 106250260 A | 12/2016 |
| WO | WO2013186602 A1 | 12/2013 |

OTHER PUBLICATIONS

Anonymous, "Automated Discovery and Masking of Sensitive Data," IP.com No. IPCOM000240280D, Jan. 2015, pp. 1-5 (+ cover).

(Continued)

*Primary Examiner* — Eric Coleman
(74) *Attorney, Agent, or Firm* — Edward J. Wixted, III; Blanche E. Schiller, Esq.; Heslin Rothenberg Farley & Mesiti P.C.

(57) ABSTRACT

Instruction interrupt suppression for an overflow condition. An instruction is executed, and a determination is made that an overflow condition occurred. Based on a per-instruction overflow interrupt indicator being set to a defined value, interrupt processing for the overflow condition is performed, and based on the per-instruction overflow interrupt indicator being set to another defined value, the interrupt processing for the overflow condition is bypassed.

25 Claims, 9 Drawing Sheets

(56) References Cited

U.S. PATENT DOCUMENTS

| | | | |
|---|---|---|---|
| 2003/0221091 A1* | 11/2003 | Henry | G06F 9/3004 |
| | | | 712/244 |
| 2011/0296229 A1* | 12/2011 | Cowlishaw | G06F 7/49905 |
| | | | 714/2 |
| 2012/0254591 A1* | 10/2012 | Hughes | G06F 9/3555 |
| | | | 712/205 |
| 2017/0090925 A1 | 3/2017 | O'Connor et al. | |
| 2018/0293078 A1* | 10/2018 | Gabrielli | G06F 9/3001 |

OTHER PUBLICATIONS

Anonymous, "Method for Verifying Intermediate Results of a Randomly Generated Testcase of Processor Functional Validation Exerciser," IP.com No. IPCOM000243758D, Oct. 2015, pp. 1-9 (+ cover).
IBM, "Exception Handling for an Interrupt-Time Driven System RPN Interpreter," IP.com No. IPCOM000010760D, Jan. 2003, pp. 1-5 (+ cover).
IBM, "z/Architecture—Principles of Operation," IBM Publication No. SA22-7832-11, Twelfth Edition, Sep. 2017, pp. 1-1902.
Mell, Peter and Tim Grance, "The NIST Definition of Cloud Computing," National Institute of Standards and Technology, Information Technology Laboratory, Special Publication 800-145, Sep. 2011, pp. 1-7.
Silicon Labs, "EMF32 Interrupt Handling—AN0039—Application Note," Sep. 2013, pp. 1-21.
Examination Report under Section 18(3), GB2111753.6, dated Jun. 30, 2022, 5 pages.

* cited by examiner

EXECUTE AN INSTRUCTION ON A PROCESSOR OF THE COMPUTING ENVIRONMENT ~500

DETERMINE, BASED ON EXECUTING THE INSTRUCTION, THAT AN OVERFLOW CONDITION OCCURRED ~502

OBTAIN A PER-INSTRUCTION OVERFLOW INTERRUPT INDICATOR FOR THE INSTRUCTION ~504

PERFORM INTERRUPT PROCESSING FOR THE OVERFLOW CONDITION, BASED ON THE PER-INSTRUCTION OVERFLOW INTERRUPT INDICATOR BEING SET TO A DEFINED VALUE ~506

BYPASS THE INTERRUPT PROCESSING FOR THE OVERFLOW CONDITION, BASED ON THE PER-INSTRUCTION OVERFLOW INTERRUPT INDICATOR BEING SET TO ANOTHER DEFINED VALUE ~508

PER-INSTRUCTION OVERFLOW INTERRUPT INDICATOR IS LOCATED IN A FIELD OF THE INSTRUCTION ~510

PER-INSTRUCTION OVERFLOW INTERRUPT INDICATOR IS LOCATED IN A LOCATION ACCESSIBLE TO THE INSTRUCTION ~512

DETERMINING THAT THE OVERFLOW CONDITION OCCURRED INCLUDES CHECKING AN OVERFLOW INDICATOR SET BASED ON EXECUTING THE INSTRUCTION ~514

PERFORMING INTERRUPT PROCESSING INCLUDES REPORTING AN INTERRUPTIBLE CONDITION ~516

PERFORMING INTERRUPT PROCESSING INCLUDES INITIATING AN INTERRUPT FOR THE INSTRUCTION ~518

FIG. 5A

INSTRUCTION INTERRUPT SUPPRESSION OF OVERFLOW EXCEPTION

BACKGROUND

One or more aspects relate, in general, to facilitating processing within a computing environment, and in particular, to facilitating processing associated with instructions that may generate overflow conditions.

Various instructions may generate an overflow condition during computation when, for instance, the result cannot be saved in the target format. This overflow condition causes the user program to jump to the interrupt handler, which takes hundreds of cycles to handle the overflow condition interrupt.

SUMMARY

Shortcomings of the prior art are overcome, and additional advantages are provided through the provision of a computer program product for facilitating processing within a computing environment. The computer program product includes a computer readable storage medium readable by a processing circuit and storing instructions for performing a method. The method includes executing an instruction on a processor of the computing environment, and based on executing the instruction, determining that an overflow condition occurred. A per-instruction overflow interrupt indicator for an instruction is obtained. Based on the per-instruction overflow interrupt indicator being set to a defined value, interrupt processing for the overflow condition is performed. Based on the per-instruction overflow interrupt indicator being set to another defined value, the interrupt processing for the overflow condition is bypassed.

By providing a per-instruction overflow interrupt indicator, flexibility is provided to user code in determining when to perform interrupt processing, reducing complexity in the code. Further, by bypassing interrupt processing, as selected, performance is improved.

As one example, the per-instruction overflow interrupt indicator is located in a field of the instruction. In another example, the per-instruction overflow interrupt indicator is located in a location accessible to the instruction.

In one embodiment, the determining that the overflow condition occurred includes checking an overflow indicator set based on executing the instruction.

As one example, the performing interrupt processing includes reporting an interruptible condition. As another example, the performing interrupt processing includes initiating an interrupt for the instruction.

Further, as examples, the defined value is one and the other defined value is zero.

In one embodiment, the executing the instruction includes performing one or more operations and the overflow condition occurred based on a result of an operation of the one or more operations being larger than a target format for the result. As an example, the operation is an operation from a group of operations consisting of arithmetic operations, conversion operations and move operations.

In one embodiment, the overflow condition is a result of executing an operation of the instruction, and the bypassing the interrupt processing includes suppressing a machine exception to be generated by the instruction.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 5A-5B depict one example of facilitating processing within a computing environment, in accordance with an aspect of the present invention;

DETAILED DESCRIPTION

In accordance with an aspect of the present invention, a capability is provided to facilitate processing within a computing environment. In one example, the capability includes temporarily disabling, on a per-instruction basis, an overflow interrupt resulting from an operation of an instruction that produces an overflow interrupt condition. The operation includes, for instance, a computational operation (e.g., arithmetic—decimal, binary coded decimal, floating point), a convert operation (e.g., binary to decimal, decimal to binary, etc.) and/or a move operation (e.g., move decimal value from one location (e.g., register) to another location), as examples. By temporarily disabling the interrupt, performance is improved.

As one example, the instruction is part of an instruction set architecture (ISA). For instance, it is a single architected hardware machine instruction at the hardware/software interface. The instruction may be one of a number of instructions that perform computational operations, convert operations, move operations and/or other operations that may cause an overflow condition resulting in an interrupt. The instruction is used in many types of processing including, but not limited to, computer processing, security processing, performing computations for various technologies, etc.

In accordance with an aspect of the present invention, the interrupt may be disabled on a per-instruction basis. For instance, an overflow interrupt indicator (e.g., a modifier bit) is included in an instruction (or otherwise associated with the instruction), that when set, temporarily disables an overflow interrupt resulting from an overflow condition. The condition code resulting from the instruction is still set to appropriately indicate an overflow condition that can be tested by the user code, if desired.

Figure 1A:
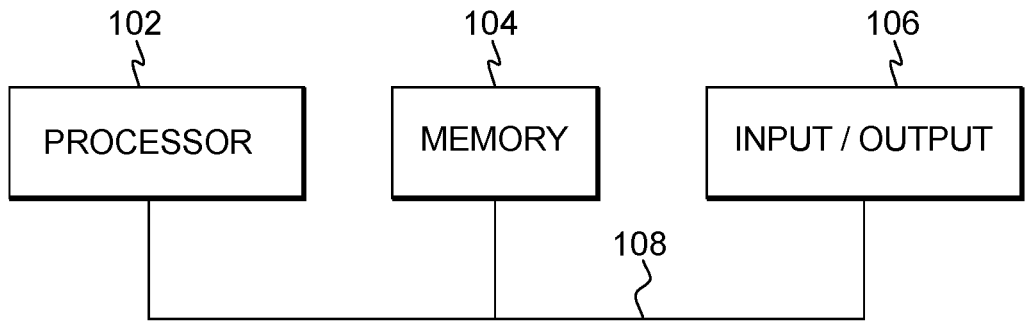
FIG. 1A depicts one example of a computing environment to incorporate and use one or more aspects of the present invention.

One embodiment of a computing environment to incorporate and use one or more aspects of the present invention is described with reference to FIG. 1A. A computing environment 100 includes, for instance, a processor 102 (e.g., a central processing unit), a memory 104 (e.g., main memory; a.k.a., system memory, main storage, central storage, storage), and one or more input/output (I/O) devices and/or interfaces 106 coupled to one another via, for example, one or more buses 108 and/or other connections.

In one example, processor 102 is based on the z/Architecture® hardware architecture offered by International Business Machines Corporation, Armonk, N.Y., and is part of a server, such as an IBM Z® server, which is also offered by International Business Machines Corporation and implements the z/Architecture hardware architecture. One embodiment of the z/Architecture hardware architecture is described in a publication entitled, "z/Architecture Principles of Operation," IBM Publication No. SA22-7832-11, 12$^{th}$ edition, September 2017, which is hereby incorporated herein by reference in its entirety. The z/Architecture hardware architecture, however, is only one example architecture; other architectures and/or other types of computing environments may include and/or use one or more aspects of the present invention. In one example, the processor executes an operating system, such as the z/OS® operating system, also offered by International Business Machines Corporation.

Figure 1B:
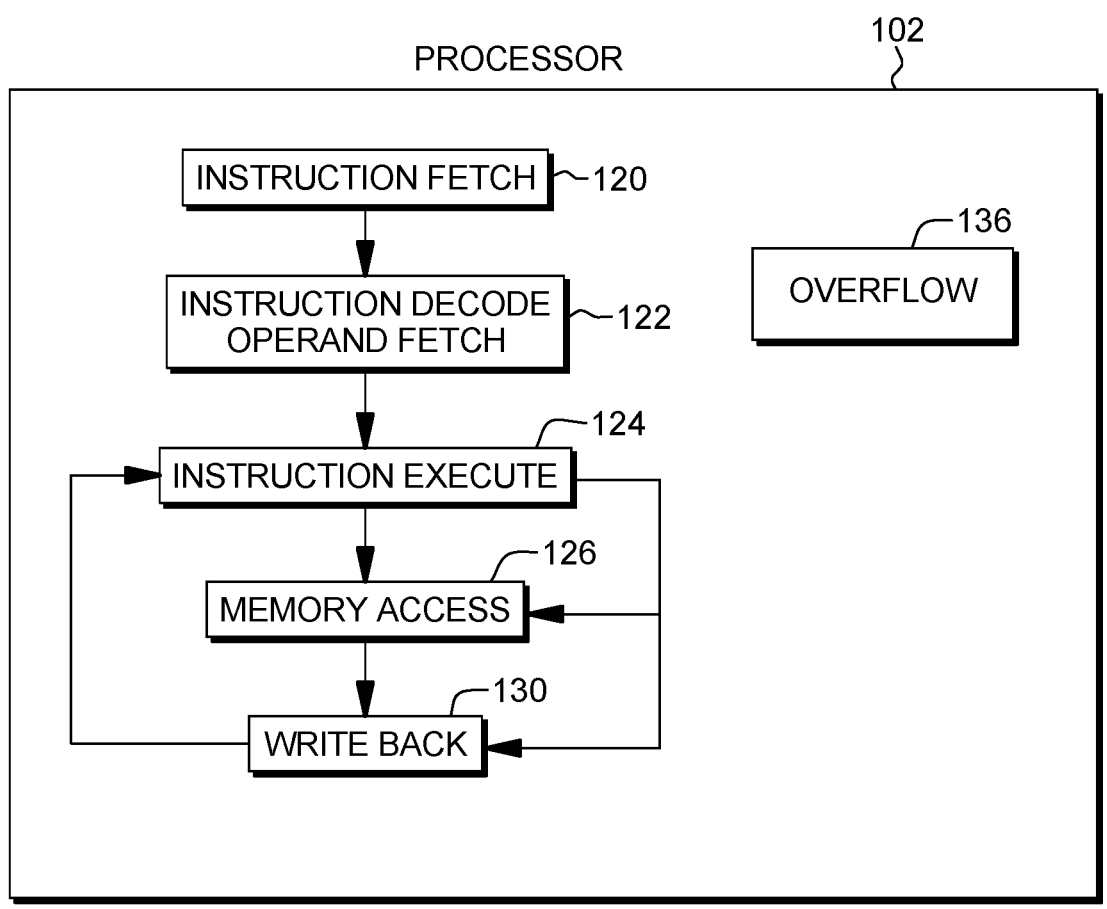
FIG. 1B depicts further details of a processor of FIG. 1A, in accordance with one or more aspects of the present invention.

Processor 102 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; an instruction execute component 124 to execute the decoded instructions; a memory access component 126 to access memory for instruction execution, if necessary; and a write back component 130 to provide the results of the executed instructions. One or more of these components may, in accordance with one or more aspects of the present invention, include at least a portion of or have access to one or more other components used in overflow processing, including overflow interrupt processing, as described herein. The one or more other components include, for instance, an overflow component 136.

Another example of a computing environment to incorporate and use one or more aspects of the present invention is described with reference to FIG. 2. In one example, the computing environment is based on the z/Architecture hardware architecture; however, the computing environment may be based on other architectures offered by International Business Machines Corporation or others.

Figure 2:
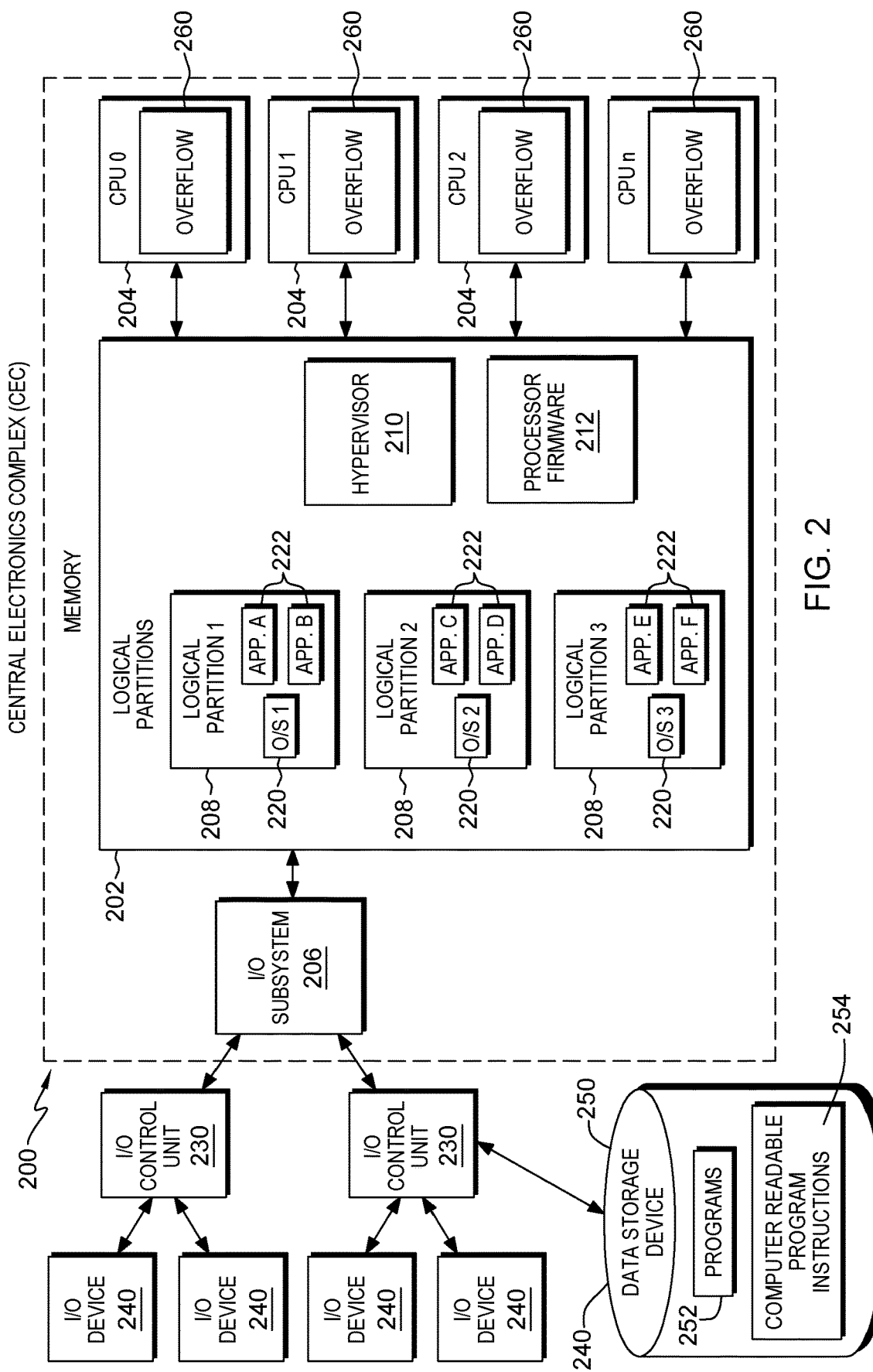
FIG. 2 depicts another example of a computing environment to incorporate and use one or more aspects of the present invention.

Referring to FIG. 2, in one example, the computing environment includes a central electronics complex (CEC) 200. CEC 200 includes a plurality of components, such as, for instance, a memory 202 (a.k.a., system memory, main memory, main storage, central storage, storage) coupled to one or more processors (a.k.a., central processing units (CPUs)) 204, and to an input/output subsystem 206.

Memory 202 includes, for example, one or more logical partitions 208, a hypervisor 210 that manages the logical partitions, and processor firmware 212. One example of hypervisor 210 is the Processor Resource/System Manager (PR/SM™) hypervisor, offered by International Business Machines Corporation, Armonk, N.Y. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each logical partition 208 is capable of functioning as a separate system. That is, each logical partition can be independently reset, run a guest operating system 220 such as the z/OS operating system, or another operating system, and operate with different programs 222. An operating system or application program running in a logical partition appears to have access to a full and complete system, but in reality, only a portion of it is available.

Memory 202 is coupled to processors (e.g., CPUs) 204, which are physical processor resources that may be allocated to the logical partitions. For instance, a logical partition 208 includes one or more logical processors, each of which represents all or a share of a physical processor resource 204 that may be dynamically allocated to the logical partition. In one example, processor 204 includes an overflow component 260 to perform overflow processing, including overflow interrupt processing, as described herein.

Further, memory 202 is coupled to I/O subsystem 206. I/O subsystem 206 may be a part of the central electronics complex or separate therefrom. It directs the flow of information between main storage 202 and input/output control units 230 and input/output (I/O) devices 240 coupled to the central electronics complex.

Many types of I/O devices may be used. One particular type is a data storage device 250. Data storage device 250 may store one or more programs 252, one or more computer readable program instructions 254, and/or data, etc. The computer readable program instructions may be configured to carry out functions of embodiments of aspects of the invention.

Computer readable program instructions configured to carry out functions of embodiments of aspects of the invention may also or alternatively be included in memory 202. Many variations are possible.

Central electronics complex 200 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 200. Examples include, but are not limited to: microcode, device drivers, redundant processing units, external disk drive arrays, RAID systems, tape drives, and data archival storage systems, etc.

Further, central electronics complex 200 may be operational with numerous other general purpose or special purpose computing system environments or configurations. Examples of well-known computing systems, environments, and/or configurations that may be suitable for use with central electronics complex 200 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Although various examples of computing environments are described herein, one or more aspects of the present invention may be used with many types of environments. The computing environments provided herein are only examples.

In accordance with an aspect of the present invention, an instruction executing on a processor, such as processor 102 or 204, includes or has access to a per-instruction overflow interrupt indicator that indicates whether overflow interrupt processing is to be bypassed for the instruction. By bypassing interrupt processing, execution cycles are reduced and performance for the processor is improved. Further details regarding the overflow interrupt indicator and processing associated therewith are described with reference to FIGS. 3 and 4.

Figure 3:
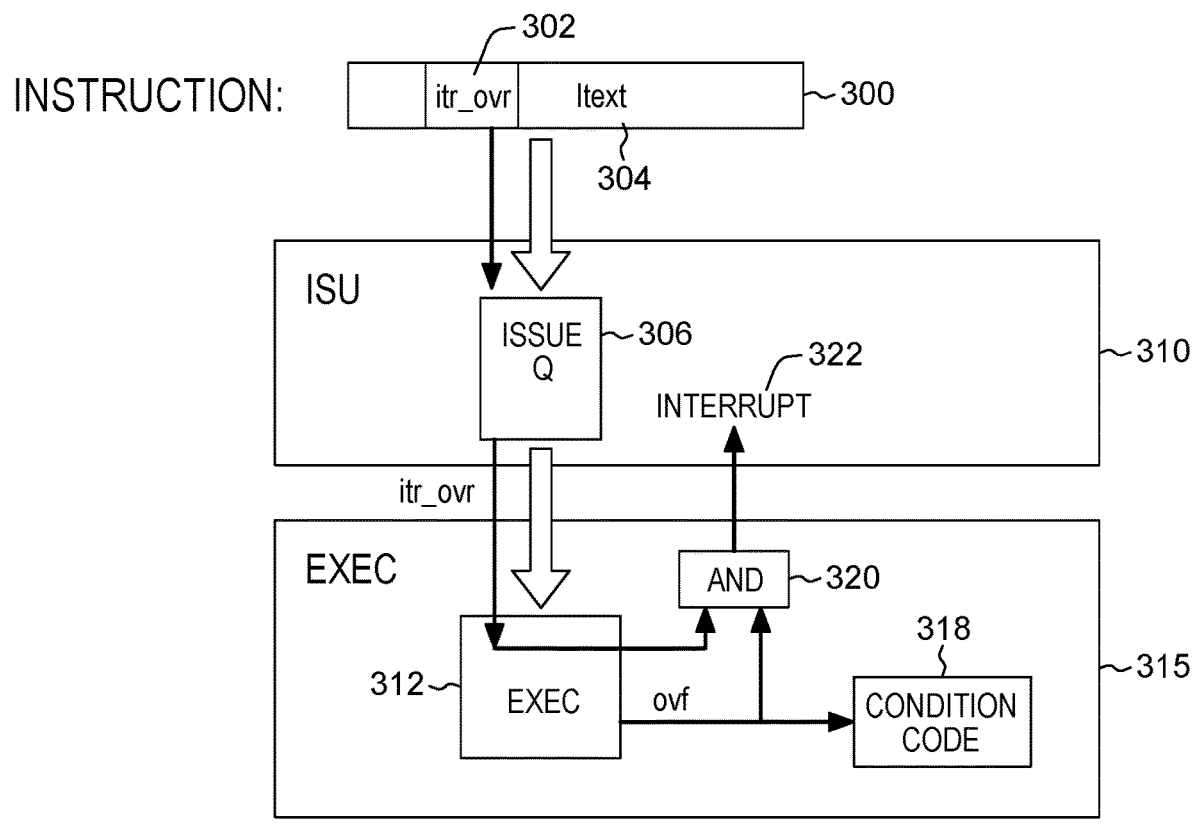
FIG. 3 depicts one example of executing an instruction based on an overflow interrupt indicator of the instruction, in accordance with an aspect of the present invention.

Referring initially to FIG. 3, in one embodiment, an instruction 300 includes a plurality of fields, including a field 302 having an overflow interrupt indicator (itr_ovr) and one or more fields 304 that include instruction text (Itext). The instruction text includes, for instance, operands used to perform an operation specified by the instruction text. The instruction can perform many types of operations that may produce an overflow condition, including, but not limited to, computations, such as arithmetic operations, e.g., decimal operations, binary coded decimal operations, floating point operations, etc.; conversion operations, such as binary to decimal, decimal to binary, etc.; and/or move operations (e.g., move decimal), as examples.

In another embodiment, the overflow interrupt indicator is not in an explicit field of the instruction, but instead, is included in an implied field or register of the instruction. Further, in another embodiment, the overflow interrupt indicator is not part of the instruction itself, but in a location (e.g., a register or memory location) accessible to the instruction, or part of another instruction (e.g., a prefix instruction) used to modify the instruction to be executed. Regardless of the embodiment, the overflow interrupt indicator is a per-instruction indicator provided specifically for the instruction that is to perform one or more operations that may produce an overflow condition.

Continuing with FIG. 3, the instruction is dispatched to an issue queue 306 of an instruction sequencing unit 310 of the processor where it waits until, for instance, its operands are available. When ready, the instruction is issued to an appropriate functional execution unit 312 of an execution unit 315 of the processor. As examples, if the instruction is a decimal instruction, it is issued to a functional unit that performs decimal computations, and if it is a floating point instruction, it is issued to a floating point functional unit. Other examples are possible.

Execution unit 312 receives the instruction to execute, as well as the overflow interrupt indicator (itr_ovr) 302. The instruction is executed in which one or more operations are performed. An indication of whether an overflow condition occurred (e.g., ovf) is provided from execution of the instruction. Further, a condition code 318 results from execution of the instruction. If there is an overflow condition, this is reflected in the condition code, in one example, allowing the user program to address the overflow condition, if desired.

Moreover, in accordance with an aspect of the present invention, the interrupt overflow indicator (itr_ovr) and the overflow condition indicator (ovf) are input to a logical operator, such as an AND gate 320 used to indicate whether an overflow condition is to be reported. For instance, if an overflow condition occurred (e.g., ovf is set to 1) and the overflow interrupt indicator is set to indicate the overflow condition is to be reported (e.g., itr_ovr is set to 1), then interrupt processing is performed (322). However, if the overflow condition did not occur (e.g., ovf is set to 0), then regardless of the setting of the overflow interrupt indicator, interrupt processing is not performed. Further, if the overflow condition did occur (e.g., ovf is set to 1) and the overflow interrupt indicator is set to bypass interrupt processing (e.g., itr_ovr is set to 0), then interrupt processing is bypassed.

In other embodiments, other logical operators and/or other values of the indicators may be used (e.g., to indicate interrupt is to be bypassed, itr_ovr is set to 1 in another example). Many variations and possibilities exist.

Further details regarding processing associated with the overflow interrupt indicator are described with reference to FIG. 4. In one example, this processing is performed by a processor, such as processor 102 or processor 204.

Figure 4:
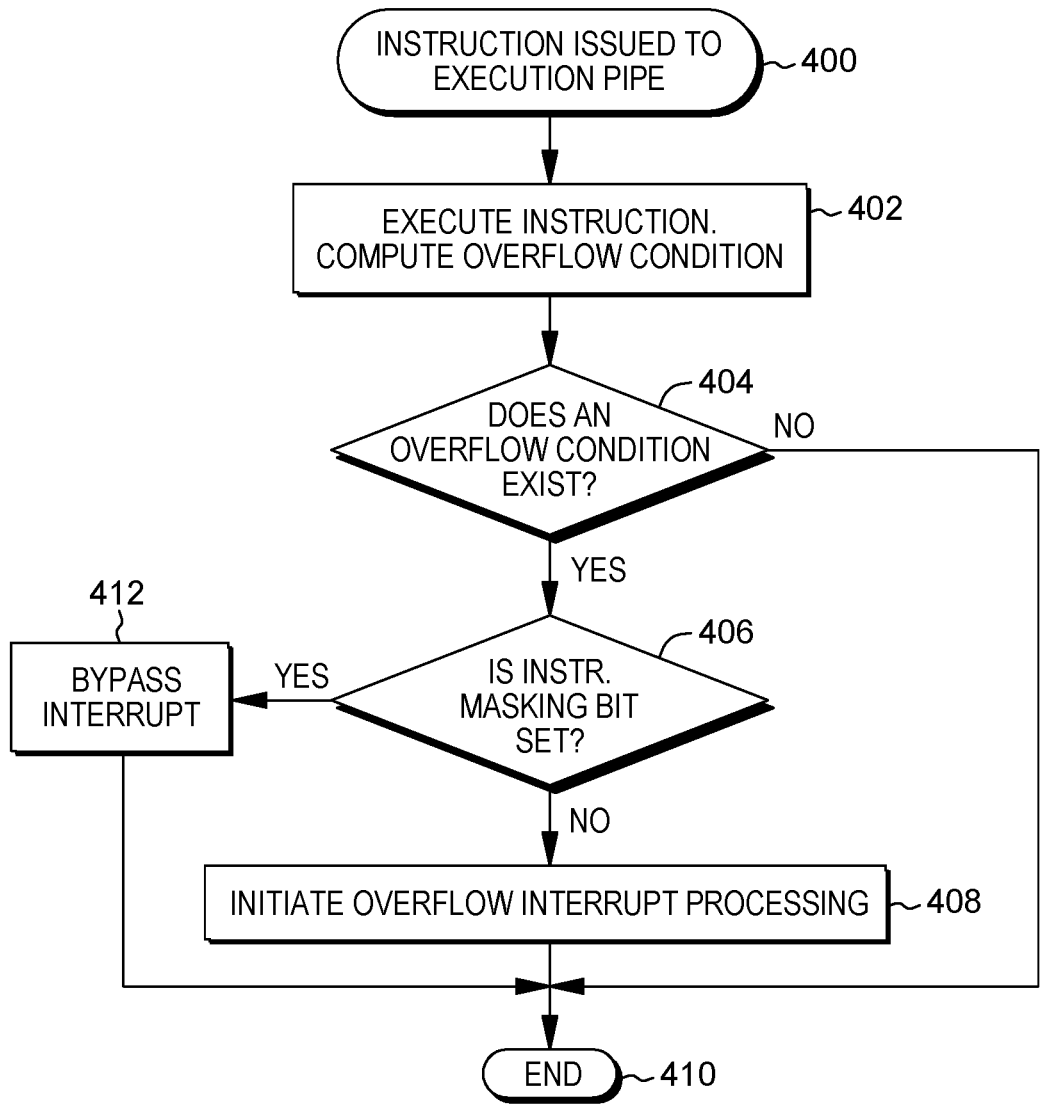
FIG. 4 depicts one example of processing associated with using the overflow interrupt indicator of the instruction of FIG. 3, in accordance with an aspect of the present invention.

Referring to FIG. 4, initially, an instruction to perform one or more operations that may result in an overflow condition is issued to an execution unit of the processor (e.g., execution unit 315), STEP 400. The instruction is executed by the execution unit of the processor, which may result in an overflow condition, STEP 402. A determination is made as to whether an overflow condition occurred, INQUIRY 404. In one example, this determination is made by checking the overflow indicator (ovf). If an overflow condition does not exist (e.g., ovf is set to 0), then processing, as it relates to the overflow interrupt indicator, is complete, STEP 410.

Returning to INQUIRY 404, if an overflow condition does exist (e.g., ovf is set to 1), then a further determination is made as to whether an overflow interrupt indicator (itr_ovr) of the instruction, also referred to as an instruction masking bit or modifier bit, is set to reflect interrupt processing is to be bypassed, INQUIRY 406. For instance, if the overflow interrupt indicator is set to a defined value (e.g., to one), interrupt processing is to be performed, based on an overflow condition. However, if the overflow interrupt indicator is set to another defined value (e.g., zero), interrupt processing is to be bypassed, based on an overflow condition. The overflow interrupt indicator (a.k.a., instruction masking bit) is said to be set when, for instance, it is set to zero, indicating interrupt processing is to be bypassed.

Continuing with INQUIRY 406, a determination is made as to whether the instruction masking bit (e.g., itr_ovr) is set (e.g., set to zero). If the instruction masking bit (e.g., itr_ovr) is not set; i.e., it is set to the defined value (e.g., one), then overflow interrupt processing is initiated, STEP 408. For instance, the interrupt is reported, and/or the interrupt is initiated (e.g., an interrupt handler is signaled). That is, the interrupt is not to be bypassed. Processing, as it relates to the overflow interrupt indicator, is complete, STEP 410.

However, in accordance with an aspect of the present invention, if the overflow interrupt indicator is set to the other defined value (e.g., to zero), then interrupt processing is bypassed 412, and processing, as it relates to the overflow interrupt indicator, is complete, STEP 410. In one example, the bypassing of interrupt processing includes suppressing a machine exception generated by the instruction. In a further example, the bypassing of interrupt processing includes not overwriting a status mask setting.

As described herein, in accordance with an aspect of the present invention, a per-instruction overflow interrupt indicator is used to determine whether or not an overflow interrupt is to be reported (and/or other interrupt processing is to be performed) for an overflow condition. By using this indicator, it is unnecessary to test the input operands before executing the instruction that could generate an interrupt to determine whether an overflow is expected, which saves additional processing cycles, reduces the code length and reduces complexity. Further, a special kernel is not needed to disable the overflow interrupt, reducing complexity. Additionally, by providing a per-instruction indicator, user code can specify for different parts of the code whether interrupt processing is to be performed. One or more parts of the code may suppress interrupts for performance reasons. The per-instruction indicator allows precise, per-instruction suppression of machine exceptions that would be generated by the instruction itself. Other variations are possible.

One or more aspects of the present invention are inextricably tied to computer technology and facilitate processing within a computer, improving performance thereof. By providing a per-instruction overflow interrupt indicator, performance is enhanced by, for instance, reducing the number of interrupts taken and by providing flexibility in the user code.

An instruction using a per-instruction overflow interrupt indicator may be included in many types of processing performing different types of tasks. For instance, it may be included in internal computer processing where computations, conversions and/or moves are performed; in security processing that verifies credentials; in any processing that arithmetic operations are used in performing a task, such as for instance, in providing distance information, computations performed in vehicles, robotics, the medical profession; warehousing; inventory control; etc. Many possibilities exist.

Further details of one embodiment of facilitating processing within a computing environment, as it relates to one or more aspects of the present invention, are described with reference to FIGS. 5A-5B.

Referring to FIG. 5A, in one embodiment, an instruction is executed on a processor of the computing environment (500), and based on executing the instruction, a determination is made that an overflow condition occurred (502). Further, a per-instruction overflow interrupt indicator for the instruction is obtained (504). Based on the per-instruction overflow interrupt indicator being set to a defined value, interrupt processing for the overflow condition is performed (506) and based on the per-instruction overflow interrupt indicator being set to another defined value, the interrupt processing for the overflow condition is bypassed (508).

As examples, the per-instruction overflow interrupt indicator is located in a field of the instruction (510) or in a location accessible to the instruction (512).

Further, in one embodiment, the determining that the overflow condition occurred includes checking an overflow indicator set based on executing the instruction (514).

Moreover, as examples, the performing interrupt processing includes reporting an interruptible condition (516) and/or initiating an interrupt for the instruction (518).

Figure 5B:
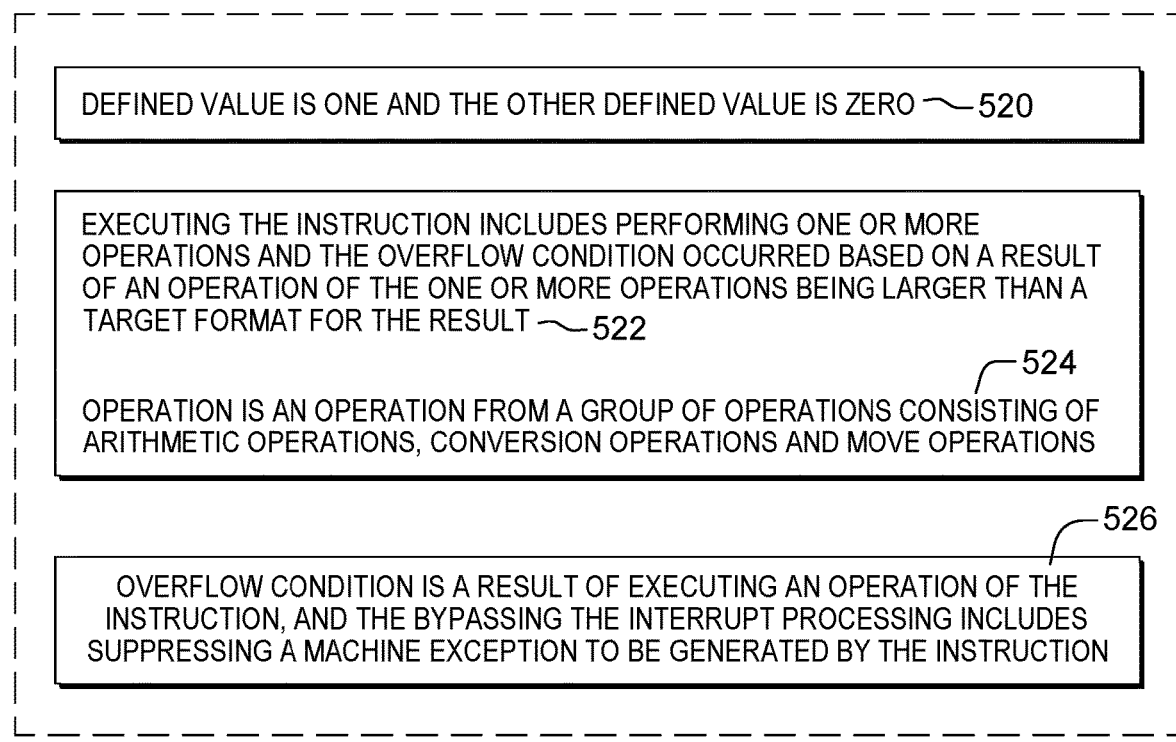

In one embodiment, referring to FIG. 5B, the defined value is one and the other defined value is zero (520).

The executing the instruction includes, for instance, performing one or more operations and the overflow condition occurred based on a result of an operation of the one or more operations being larger than a target format for the result (522). As an example, the operation is an operation from a group of operations consisting of arithmetic operations, conversion operations and move operations (524).

Further, in one embodiment, the overflow condition is a result of executing an operation of the instruction, and the bypassing the interrupt processing includes suppressing a machine exception to be generated by the instruction (526).

Other variations and embodiments are possible.

Figure 6A:
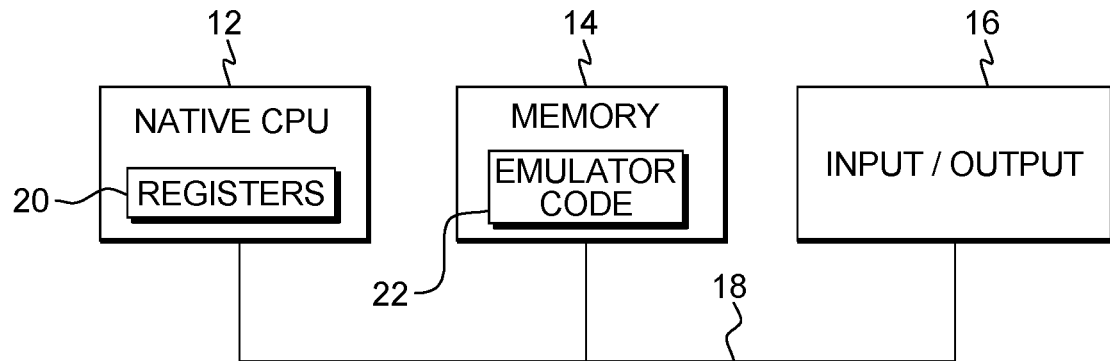
FIG. 6A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 6A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. IBM, z/Architecture, IBM Z, z/OS, PR/SM and PowerPC are trademarks or registered trademarks of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 6B:
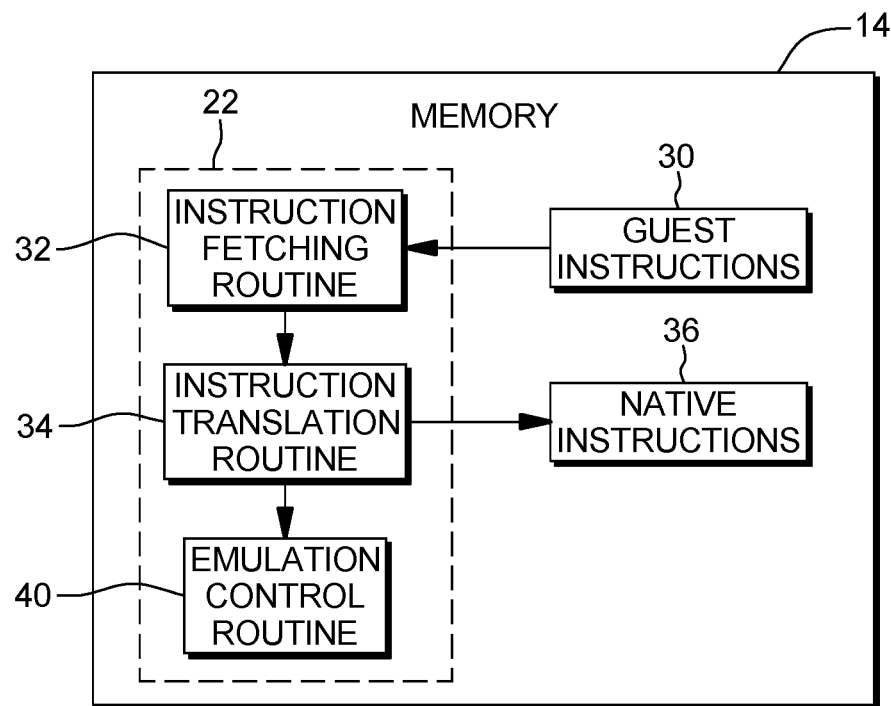
FIG. 6B depicts further details of the memory of FIG. 6A.

Further details relating to emulator code 22 are described with reference to FIG. 6B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, and/or emulated environments, may be used; embodiments are not limited to any one environment.

Each computing environment is capable of being configured to include one or more aspects of the present invention. For instance, each may be configured to provide overflow processing, in accordance with one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
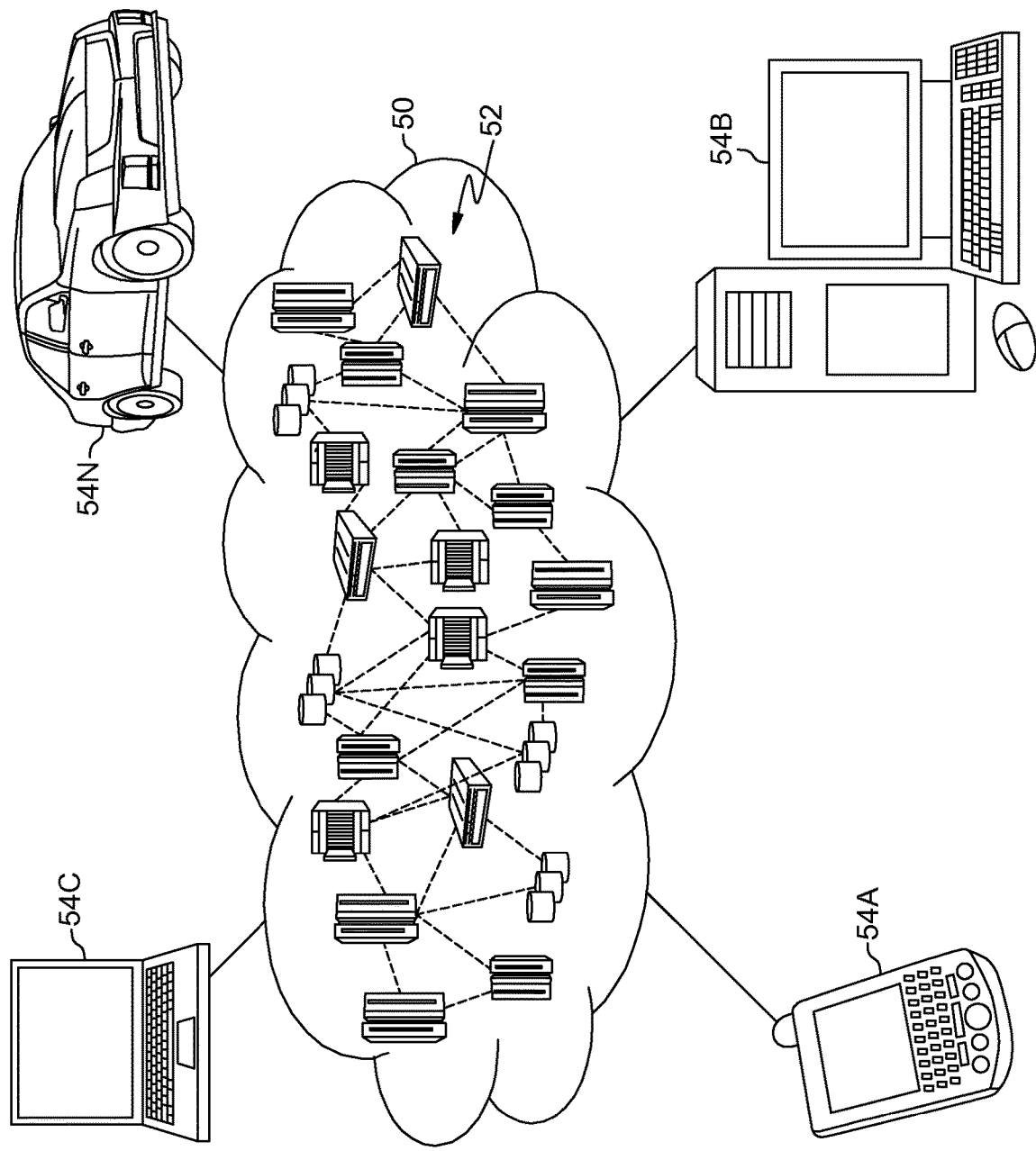
FIG. 7 depicts one embodiment of a cloud computing environment.

Referring now to FIG. 7, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 52 and cloud computing environment 50 can communicate with any type of computerized device over any type of network and/or network addressable connection (e.g., using a web browser).

Figure 8:
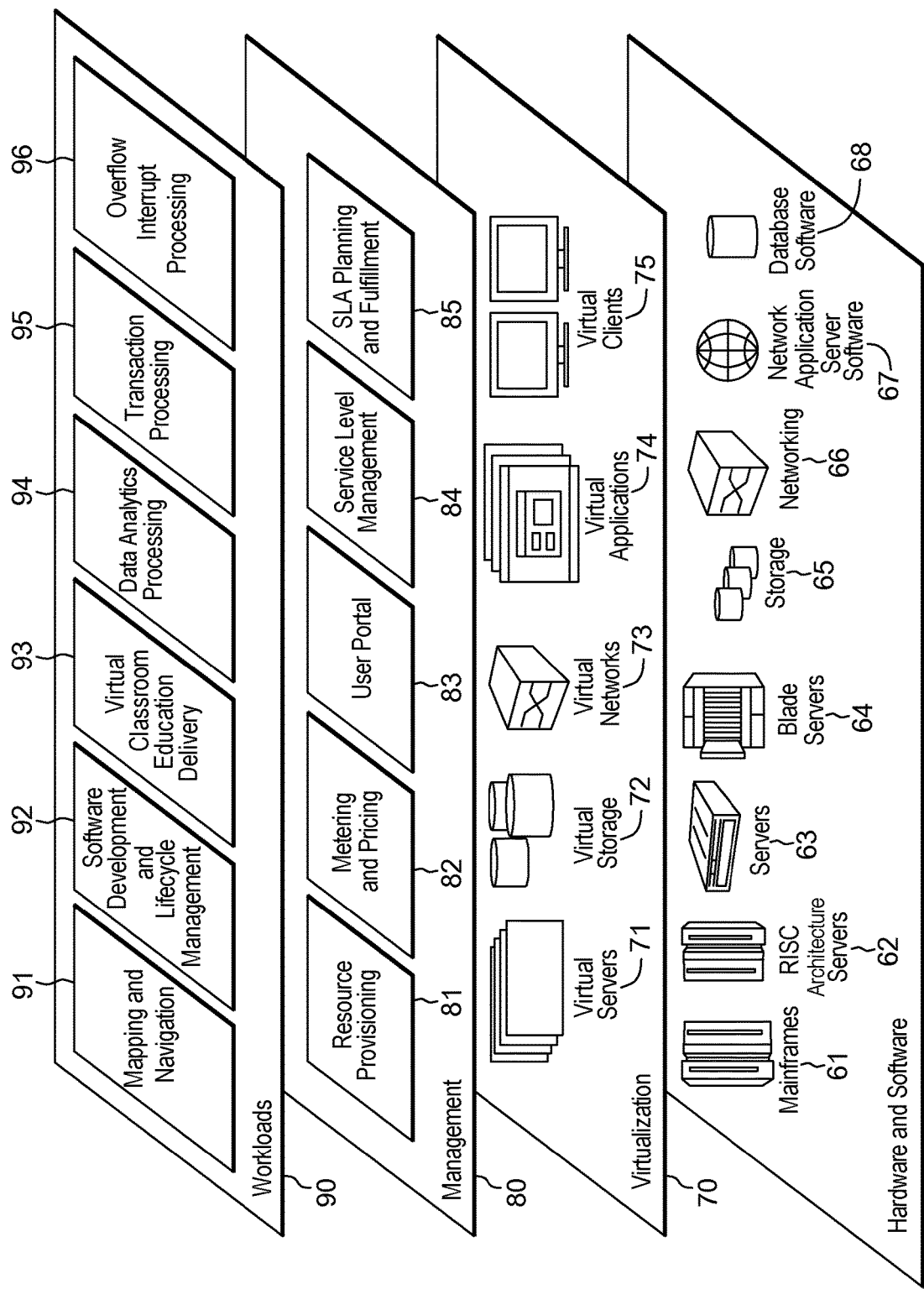
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and overflow interrupt processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, different types of indicators may be specified. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    at least one computer readable storage medium readable by at least one processing circuit and storing instructions for performing a method comprising:
        executing an instruction on a processor of the computing environment;
        performing one or more operations, based on executing the instruction;
        setting a condition code pertaining to the instruction, as a result of executing the instruction;
        determining, based on executing the instruction, whether an overflow condition occurred, the determining using an overflow indicator;
        based on determining the overflow condition occurred:
            setting the condition code to reflect the overflow condition, based on the overflow condition occurring, the condition code being separate from the overflow indicator and set based on execution of the instruction being executed;
            obtaining a per-instruction overflow interrupt indicator for the instruction, the per-instruction overflow interrupt indicator being specified by the instruction and located in a field of the instruction, the per-instruction overflow interrupt indicator indicating whether interrupt processing is to be disabled for the instruction based on the overflow condition;
            performing a logical operation using the overflow indicator indicating that the overflow condition occurred and the per-instruction overflow interrupt indicator to obtain a result of the logical operation; and
            bypassing interrupt processing for the overflow condition, based at least in part on the result of the logical operation and the per-instruction overflow interrupt indicator being set to a defined value, wherein the condition code resulting from execution of the instruction and separate from the overflow indicator is still set to reflect the overflow condition based on the bypassing occurring, the condition code pertaining to the instruction reflecting one or more resulting conditions of the instruction being executed.

2. The computer program product of claim 1, wherein the method further comprises performing the interrupt processing for the overflow condition, based at least in part on the result of the logical operation and the per-instruction overflow interrupt indicator being set to another defined value.

3. The computer program product of claim 1, wherein the overflow condition occurred based on performing an operation of the one or more operations, the operation being an arithmetic operation.

4. The computer program product of claim 1, wherein the bypassing the interrupt processing comprises suppressing a machine exception to be generated by the instruction.

5. The computer program product of claim 2, wherein the performing interrupt processing comprises reporting an interruptible condition.

6. The computer program product of claim 1, wherein the bypassing the interrupt processing comprises not overwriting a status mask setting.

7. The computer program product of claim 1, wherein the defined value is zero and the other defined value is one.

8. The computer program product of claim 1, wherein the overflow condition occurred based on a result of an operation of the one or more operations being larger than a target format for the result.

9. The computer program product of claim 8, wherein the operation is an operation from a group of operations consisting of arithmetic operations, conversion operations and move operations.

10. The computer program product of claim 1, wherein the overflow condition is a result of executing an operation of the instruction, and wherein the bypassing the interrupt processing temporarily disables, on a per-instruction basis, an overflow interrupt resulting from the overflow condition and comprises suppressing a machine exception to be generated by the instruction and not overwriting a status mask setting.

11. A computer system for facilitating processing within a computing environment, the computer system comprising:
    a memory; and
    a processor coupled to the memory, wherein the computer system is configured to perform a method comprising:
        executing an instruction on the processor;
        performing one or more operations, based on executing the instruction;
        setting a condition code pertaining to the instruction, as a result of executing the instruction;
        determining, based on executing the instruction, whether an overflow condition occurred, the determining using an overflow indicator;
        based on determining that the overflow condition occurred:
            setting the condition code to reflect the overflow condition, based on the overflow condition occurring, the condition code being separate from the overflow indicator and set based on execution of the instruction being executed;
            obtaining a per-instruction overflow interrupt indicator for the instruction, the per-instruction overflow interrupt indicator being specified by the instruction and located in a field of the instruction, the per-instruction overflow interrupt indicator indicating whether interrupt processing is to be disabled for the instruction based on the overflow condition;
            performing a logical operation using the overflow indicator indicating that the overflow condition occurred and the per-instruction overflow interrupt indicator to obtain a result of the logical operation; and
            bypassing interrupt processing for the overflow condition, based at least in part on the result of the logical operation and the per-instruction overflow interrupt indicator being set to a defined value, wherein the condition code resulting from execution of the instruction and separate from the overflow indicator is still set to reflect the overflow condition based on the bypassing occurring, the condition code pertaining to the instruction reflecting one or more resulting conditions of the instruction being executed.

12. The computer system of claim 11, wherein the method further comprises performing the interrupt processing for the overflow condition, based at least in part on the result of the logical operation and the per-instruction overflow interrupt indicator being set to another defined value.

13. The computer system of claim 11, wherein the overflow condition occurred based on performing an operation of the one or more operations, the operation being an arithmetic operation.

14. The computer system of claim 11, wherein the overflow condition occurred based on a result of an operation of the one or more operations being larger than a target format for the result.

15. The computer system of claim 11, wherein the overflow condition is a result of executing an operation of the instruction, and wherein the bypassing the interrupt processing temporarily disables, on a per-instruction basis, an overflow interrupt resulting from the overflow condition and comprises suppressing a machine exception to be generated by the instruction and not overwriting a status mask setting.

16. A computer-implemented method of facilitating processing within a computing environment, the computer-implemented method comprising:
  executing an instruction on a processor of the computing environment;
  performing one or more operations, based on executing the instruction;
  setting a condition code pertaining to the instruction, as a result of executing the instruction;
  determining, based on executing the instruction, whether an overflow condition occurred, the determining using an overflow indicator;
  based on determining that the overflow condition occurred:
    setting the condition code to reflect the overflow condition, based on the overflow condition occurring, the condition code being separate from the overflow indicator and set based on execution of the instruction;
    obtaining a per-instruction overflow interrupt indicator for the instruction, the per-instruction overflow interrupt indicator being specified by the instruction and located in a field of the instruction, the per-instruction overflow interrupt indicator indicating whether interrupt processing is to be disabled for the instruction based on the overflow condition;
    performing a logical operation using the overflow indicator indicating that the overflow condition occurred and the per-instruction overflow interrupt indicator to obtain a result of the logical operation; and
    bypassing interrupt processing for the overflow condition, based at least in part on the result of the logical operation and the per-instruction overflow interrupt indicator being set to a defined value, wherein the condition code resulting from execution of the instruction and separate from the overflow indicator is still set to reflect the overflow condition based on the bypassing occurring, the condition code pertaining to the instruction being executed and reflecting one or more resulting conditions of the instruction being executed.

17. The computer-implemented method of claim 16, further comprising performing the interrupt processing for the overflow condition, based at least in part on the result of the logical operation and the per-instruction overflow interrupt indicator being set to another defined value.

18. The computer-implemented method of claim 16, wherein the overflow condition occurred based on performing an operation of the one or more operations, the operation being an arithmetic operation.

19. The computer-implemented method of claim 16, wherein the overflow condition occurred based on a result of an operation of the one or more operations being larger than a target format for the result.

20. The computer-implemented method of claim 16, wherein the overflow condition is a result of executing an operation of the instruction, and wherein the bypassing the interrupt processing temporarily disables, on a per-instruction basis, an overflow interrupt resulting from the overflow condition and comprises suppressing a machine exception to be generated by the instruction and not overwriting a status mask setting.

21. The computer-implemented method of claim 16, wherein the bypassing the interrupt processing comprises suppressing a machine exception to be generated by the instruction.

22. The computer-implemented method of claim 16, wherein the bypassing the interrupt processing comprises not overwriting a status mask setting.

23. The computer-implemented method of claim 17, wherein the performing interrupt processing comprises reporting an interruptible condition.

24. A computer program product for facilitating processing within a computing environment, the computer program product comprising:
  at least one computer readable storage medium readable by at least one processing circuit and storing instructions for performing a method comprising:
    executing an instruction on a processor of the computing environment;
    performing one or more operations, based on executing the instruction;
    setting a condition code as a result of executing the instruction;
    determining, based on executing the instruction, whether an overflow condition occurred, the determining using an overflow indicator;
    based on determining the overflow condition occurred:
      setting the condition code to reflect the overflow condition, based on the overflow condition occurring, the condition code being separate from the overflow indicator;
      obtaining a per-instruction overflow interrupt indicator for the instruction, the per-instruction overflow interrupt indicator being specified by the instruction and located in a location accessible to the instruction, the per-instruction overflow interrupt indicator indicating whether interrupt processing is to be disabled for the instruction based on the overflow condition;
      performing a logical operation using the overflow indicator indicating that the overflow condition occurred and the per-instruction overflow interrupt indicator to obtain a result of the logical operation; and bypassing interrupt processing for the overflow condition, based at least in part on the result of the logical operation and the per-instruction overflow interrupt indicator being set to a defined value, wherein the condition code resulting from execution of the instruction and separate from the overflow indicator is still set to reflect the overflow condition based on the bypassing occurring, and wherein the bypassing the interrupt processing comprises not overwriting a status mask setting.

25. A computer-implemented method of facilitating processing within a computing environment, the computer-implemented method comprising:

executing an instruction on a processor of the computing environment;

performing one or more operations, based on executing the instruction;

setting a condition code as a result of executing the instruction;

determining, based on executing the instruction, whether an overflow condition occurred, the determining using an overflow indicator;

based on determining that the overflow condition occurred:

setting the condition code to reflect the overflow condition, based on the overflow condition occurring, the condition code being separate from the overflow indicator;

obtaining a per-instruction overflow interrupt indicator for the instruction, the per-instruction overflow interrupt indicator being specified by the instruction and located in a location accessible to the instruction, the per-instruction overflow interrupt indicator indicating whether interrupt processing is to be disabled for the instruction based on the overflow condition;

performing a logical operation using the overflow indicator indicating that the overflow condition occurred and the per-instruction overflow interrupt indicator to obtain a result of the logical operation; and bypassing interrupt processing for the overflow condition, based at least in part on the result of the logical operation and the per-instruction overflow interrupt indicator being set to a defined value, wherein the condition code resulting from execution of the instruction and separate from the overflow indicator is still set to reflect the overflow condition based on the bypassing occurring, and wherein the bypassing the interrupt processing comprises not overwriting a status mask setting.

* * * * *